(12) United States Patent
Paloheimo et al.

(10) Patent No.: US 7,063,168 B2
(45) Date of Patent: Jun. 20, 2006

(54) DEVICE FOR REMOVING PLANTS OR THE LIKE FROM GROUND

(75) Inventors: Markus Paloheimo, Helsinki (FI); Olavi Lindén, Billnäs (FI)

(73) Assignee: Fiskars Consumer Oy Ab, Billnas (FI)

( * ) Notice: Subject to any disclaimer, the term of this patent is extended or adjusted under 35 U.S.C. 154(b) by 0 days.

(21) Appl. No.: 10/821,129

(22) Filed: Apr. 8, 2004

(65) Prior Publication Data

US 2004/0216653 A1 Nov. 4, 2004

(30) Foreign Application Priority Data

Apr. 9, 2003 (FI) .................................. 20030535

(51) Int. Cl.
*A01B 1/00* (2006.01)
(52) U.S. Cl. .................... 172/378; 7/114; 254/132; 294/50.9
(58) Field of Classification Search .............. 254/132; 294/50.6–50.9; 172/21, 22, 25, 371–378; 7/114, 125

See application file for complete search history.

(56) References Cited

U.S. PATENT DOCUMENTS

| 192,282 | A | * | 6/1877 | Rhodes ...................... 111/101 |
| 505,815 | A | * | 10/1893 | Capewell ..................... 254/19 |
| 862,685 | A | * | 8/1907 | Walker ....................... 294/50.8 |
| 935,020 | A | * | 9/1909 | Harvey ....................... 254/132 |
| 1,065,606 | A | | 6/1913 | Hayes |
| 1,502,246 | A | | 7/1924 | Hagopian |
| 2,016,640 | A | | 10/1935 | Lehota |
| 2,041,263 | A | | 5/1936 | Nirdlinger |
| 2,749,088 | A | * | 6/1956 | Jennens ...................... 254/132 |
| 3,310,121 | A | * | 3/1967 | Hussar ........................ 171/62 |
| 4,489,787 | A | | 12/1984 | Gary |
| 4,673,165 | A | * | 6/1987 | Nelson et al. .............. 254/132 |
| 5,154,465 | A | * | 10/1992 | Pakosh ...................... 294/50.8 |
| 5,456,449 | A | * | 10/1995 | Smith ......................... 254/132 |
| 5,558,378 | A | * | 9/1996 | Byrd ......................... 294/50.8 |
| 5,865,259 | A | | 2/1999 | Catto |
| 6,698,526 | B1 | * | 3/2004 | Mathisen .................... 172/371 |

FOREIGN PATENT DOCUMENTS

| CH | 670 353 | 6/1989 |
| DE | 562 854 | 10/1932 |
| GB | 412407 | 6/1934 |

* cited by examiner

*Primary Examiner*—Victor Batson
(74) *Attorney, Agent, or Firm*—Foley & Lardner LLP

(57) ABSTRACT

The invention relates to a device for removing plants or the like from the ground. The device comprises an elongated shaft, a ground support pivoted to a first end of the shaft transversely in relation to the longitudinal axis thereof and at least two blades including grip ends forming an extension of the shaft. The device is characterized in that the blades are pivoted in respect of the ground support transversely in relation to the longitudinal axis of the shaft and functionally connected together such that turning the shaft and the ground support in respect of each other causes the grip ends of the blades to move towards one another, thus enabling to grip the plant.

6 Claims, 6 Drawing Sheets

Stage 2

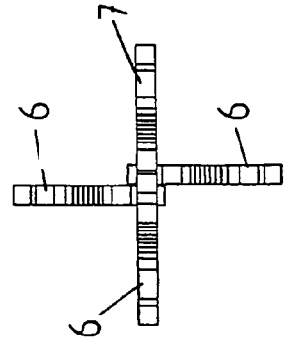
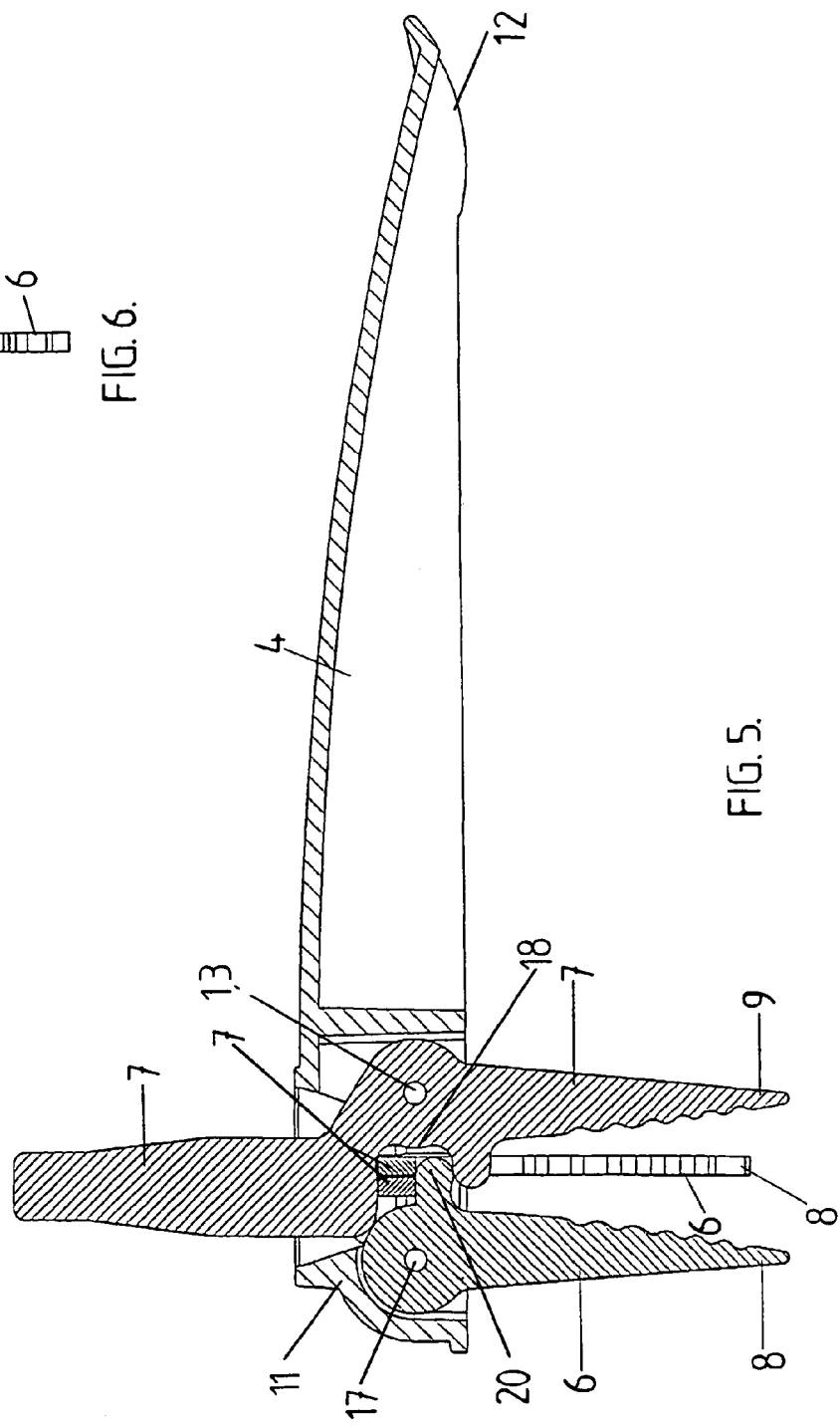

DEVICE FOR REMOVING PLANTS OR THE LIKE FROM GROUND

BACKGROUND OF THE INVENTION

The invention relates to a device according to the preamble of claim 1 comprising an elongated shaft, a ground support pivoted to a first end of the shaft transversely in relation to the longitudinal axis thereof and at least two blades including grip ends forming an extension of the shaft.

Various kinds of devices are previously known in the art for removing plants, weeds or the like from the ground, in other words for weeding for instance dandelions from the lawn. An example of such a prior art device for pulling weeds is presented in U.S. Pat. No. 1,065,606.

The prior art solutions according to the device disclosed in the publication mentioned above typically comprise an elongated shaft with a first blade fixedly mounted to the second end as an extension thereof. The fixed blade is in relation to the shaft transversely provided with a ground support, and the end closest to the shaft forms a second blade as an extension of the shaft and can be moved in respect of the shaft. When weeding for instance a dandelion from the lawn, the above-mentioned blades provided as the extension of the shaft are pressed into the ground around the dandelion so that the blades are placed on opposite sides of the dandelion. The blades are pressed so deep into the ground that the ground support can be supported on the ground. Thereafter, the shaft starts to be turned in the direction of the ground support towards the ground and at the same time ground support is pressed down to the ground assisted by the foot of the operator. Then the ground support and the blade forming the second end thereof remain in position in relation to the ground and the shaft connected to the ground support with a joint and the first blade fixedly mounted thereto move in relation to the ground and the ground support, whereby the ends of the first and the second blade move towards each other, thus enabling to grip the dandelion beneath the ground. When continuing to turn the shaft as described above the device pulls out a dandelion gripped by the blades from the ground.

A problem with the above arrangement is that the moving blade has to perform a movement of significant size in comparison with the fixed blade and the gripping is not carried out smoothly in such a case. Also, the blades in the device are arranged such that gripping the roots or other parts of the plant is made difficult in practice and the plant is therefore only partly removed from the ground.

BRIEF DESCRIPTION OF THE INVENTION

It is an object of the invention to provide a device according to the characterizing part of claim 1 that allows solving the above problems. The object of the invention is achieved with a device, which is characterized in that the blades are pivoted in respect of the ground support transversely in relation to the longitudinal axis of the shaft and functionally connected together such that turning the shaft and the ground support in respect of each other causes the grip ends of the blades to move towards one another, thus enabling to grip the plant. Consequently the movement is in a controlled manner aimed at the root, which is known to be located fairly exactly in the middle of the blades.

The preferred embodiments of the invention are disclosed in the dependent claims.

The idea of the invention is that the blades of the device are pivoted to the ground support, which in turn is pivoted to an elongated shaft transversely in relation to the longitudinal axis thereof, whereby turning the shaft towards the ground in the direction of the ground support causes the ends of all the sharp blades to move simultaneously towards one another, thus enabling to grip the plant or the like. In such a case, when using the mechanism according to the present invention, gripping a plant is accurate and efficient and the plant can easily be removed from the ground. The solution of the type presented in the present invention also allows employing more than two blades as a result of the arrangement of the above-described blades.

In a preferred embodiment of the present invention, one of the blades is fixedly mounted as an extension of the shaft such that a ground support is pivoted to the fixed blade and that the fixed blade is functionally connected to the other blades pivoted to the ground support such that when the shaft is turned in relation to the ground support the fixed blade causes the grip ends of the other blades to move towards one another and towards the grip end of the fixed blade. The blades are thus preferably functionally connected to each other by means of a toothing.

In an application of a preferred embodiment of the invention, the fixed shaft is provided with a tooth gap and the other blades pivoted to the ground support are provided with teeth, which are placed in the tooth gap such that when the shaft is turned in relation to the ground support, the fixed blade causes the grip ends of the other teeth to move towards one another and towards the grip end of the blade.

The device according to the invention comprises in an embodiment one fixed blade and another opposing blade. In another embodiment the device according to the present invention comprises one fixed blade and at least two blades moving in relation thereto placed in a circular array at regular intervals.

Furthermore, in an embodiment according to the present invention the device comprises one fixed blade and three blades moving in relation thereto, which are placed in a circular array at regular intervals so that a tooth of the blade opposite to the fixed blade is placed in the tooth gap of the fixed blade at different height levels as well as the teeth of two other mutually opposed blades, which are placed in parallel at the same height level.

An embodiment of the present invention preferably further comprises a lifting part, which is pivoted from the first end thereof to the shaft and functionally connected from the second end thereof to the blades such that turning the shaft and the ground support in relation to one another causes the lifting part to rise upwards, thus allowing the grip ends of the blades functionally connected thereto to move towards one another.

In an embodiment, the blades are functionally connected together by means of the lifting part and further in another embodiment the blades are functionally connected to the lifting part and to each other by means of a toothing.

In an embodiment of the invention the device comprises two opposing blades functionally connected to the lifting part or at least three blades placed in a circular array at regular intervals.

BRIEF DESCRIPTION OF THE DRAWINGS

In the following, the invention will be explained in greater detail by means of the preferred embodiments with reference to the accompanying drawings, in which:

FIG. 5 shows a cross-sectional view of the device according to the embodiment shown in FIG. 2;

FIG. 6 shows the array of the blades according to the embodiment of the invention shown in FIG. 3.

DETAILED DESCRIPTION OF THE INVENTION

Figure 1:
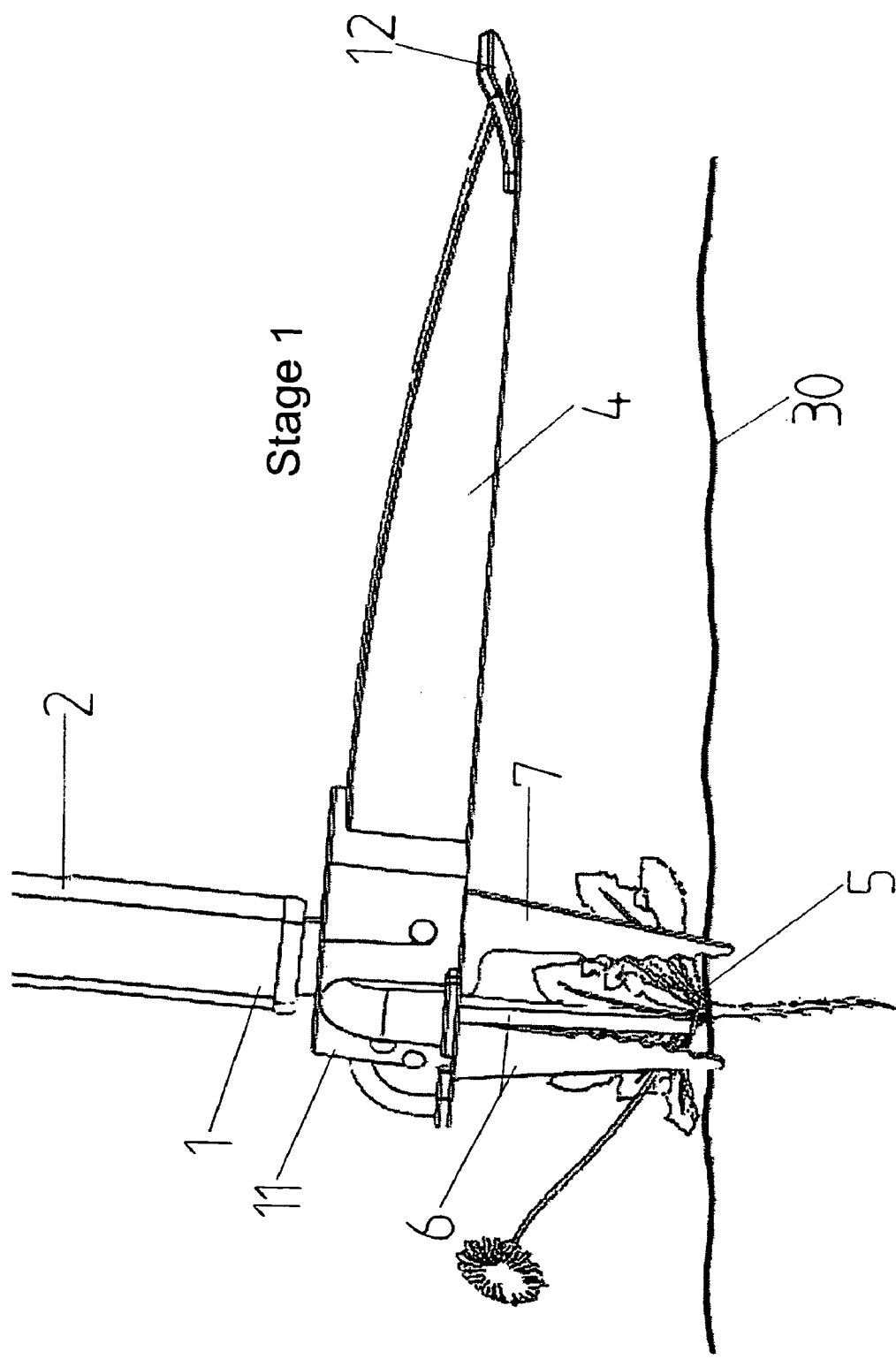
FIGS. 1, 2 and 3 are schematic views showing by way of example how to use the device according to the present invention for removing plants or the like from the ground.
Figure 2:
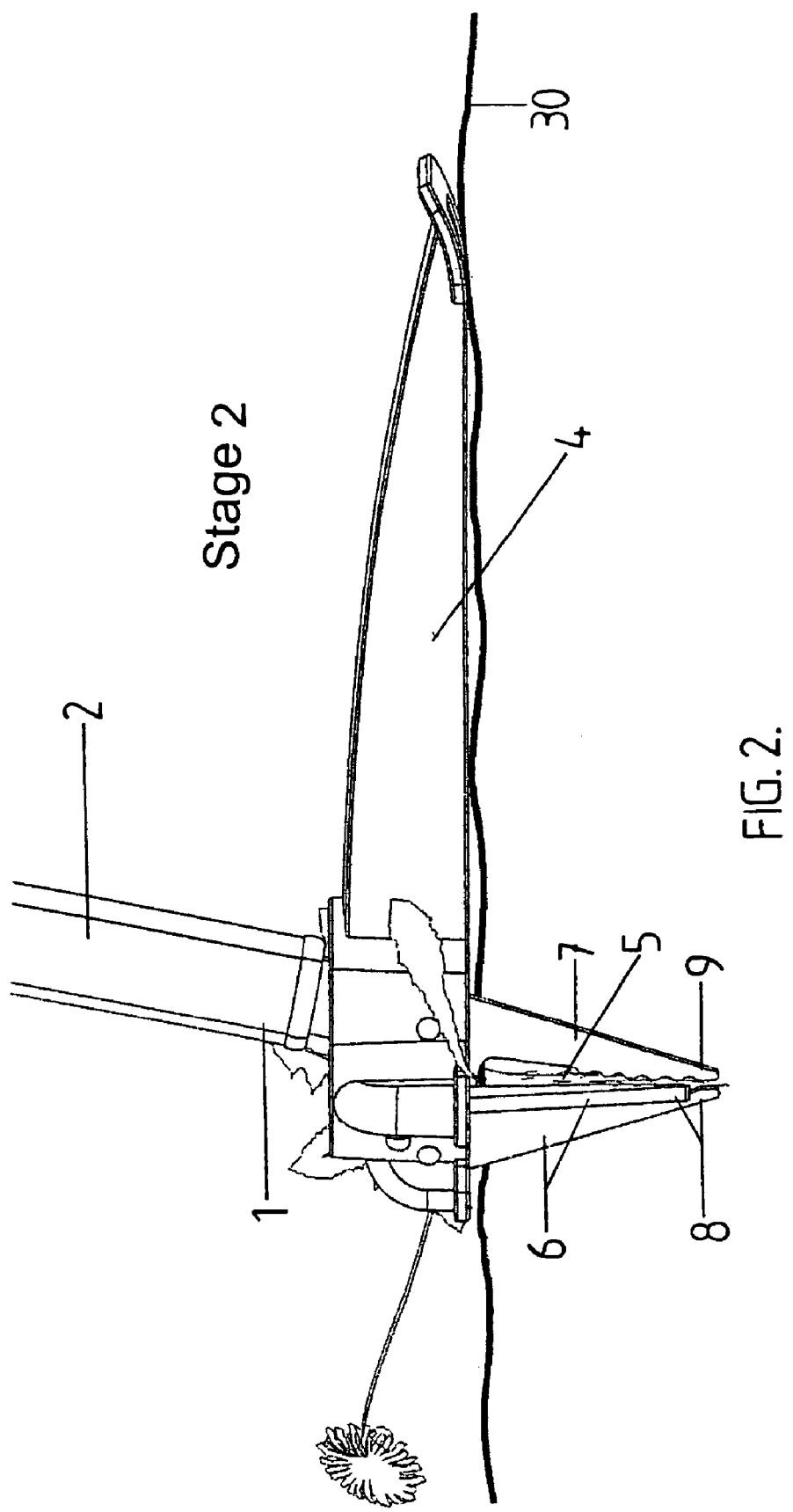
Figure 3:
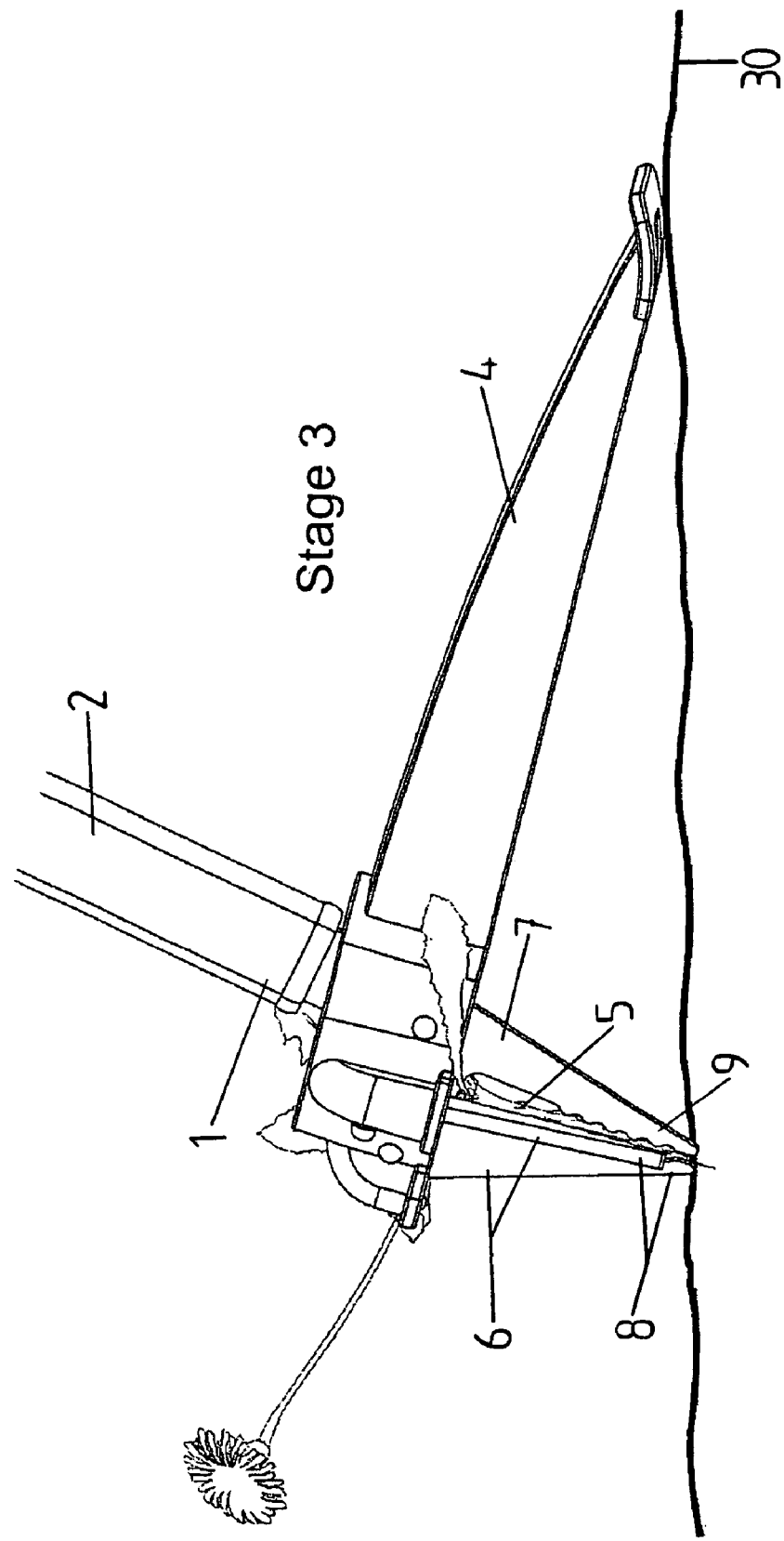

With reference to FIGS. 1, 2 and 3, the use of the device according to the present invention is shown in principle for removing plants 5 or the like from the ground 30. In accordance with the Figures, the device comprises an elongated shaft 2 with an elongated ground support 4 pivoted to a first end thereof transversely in relation to the longitudinal axis of the shaft. At least two blades 6, 7 forming an extension of the shaft are in turn pivoted to a first end 11 of the ground support, i.e. the end of the side of the shaft 2. In this embodiment the number of blades is four, and the blades form a grip-like arrangement.

When using the present invention, the user of the device grasps a second end (not shown) of the shaft 2 or close thereto and presses the blades 6, 7 that form the extension of the first end 1 of the shaft 2 into the ground 30 around the plant 5 to be removed in accordance with FIG. 1. During this initial state when pressed into the ground 30, the grip ends 8, 9 of the blades 6, 7 of the device are placed apart so that the plant to be removed from the ground 30 remains in the middle of the blades that are placed apart from one another. The blades 6, 7 are preferably pressed into the ground 30 almost all the way to the ground support 4.

After the blades 6, 7 of the device are pressed into the ground 30 around the plant 5 or the like, the shaft 2 starts to be turned in relation to the ground support 4 towards the ground 30 substantially towards the ground support 4 in accordance with FIG. 2. The ground support 4 is pivoted in relation to the shaft 2 and the blades 6, 7 are in turn pivoted in relation to the longitudinal axis of the shaft 2 transversely to the ground support 4. Then, turning the shaft 2 in respect of the ground support 4 supported on the ground 30 causes the grip ends 8, 9 of the blades 6, 7 functionally connected to the shaft 2 to move towards each other. While the grip ends 8, 9 move towards each other, the grip formed thereby is closed as a result of the turning of the shaft 2 and the plant 5 in the middle of the blades 6, 7 is tightly squeezed between the grip ends 8, 9. The grip ends 8, 9 of the blades 6, 7 preferably move towards each other until they are completely squeezed against each other, leaving the plant to be pulled from the ground 30 between them as shown in FIG. 2. The turning of the shaft can be assisted by the foot of the operator to press the ground support 4 against the ground, in which case the device remains firmly in position when the shaft 2 is turned.

When continuing to turn the shaft 2 further towards the ground 30 while the blades 6, 7 are tightly squeezed around the roots of the plant 5, the end point of the turning distance of the shaft 2 is achieved, and the shaft cannot be moved further from this point in relation to the ground support 4. Thus, the device starts to pry the blades 6, 7 pushed into the ground 30 and the plant 5 squeezed between them from the ground 30. Turning the shaft 2 is continued as long as the blades 6, 7 are completely lifted from the ground 30 and at the same time pulling the plant 5 squeezed between the blades 6, 7 from the ground 30 as shown in FIG. 3. Then the plant 5, the weed, the dandelion or equivalent target found in the ground 30 and desired to be removed can easily be pulled and removed from the ground 30. A small hole is left in the ground 30 after the removal, which can easily be filled if desired.

Figure 4:
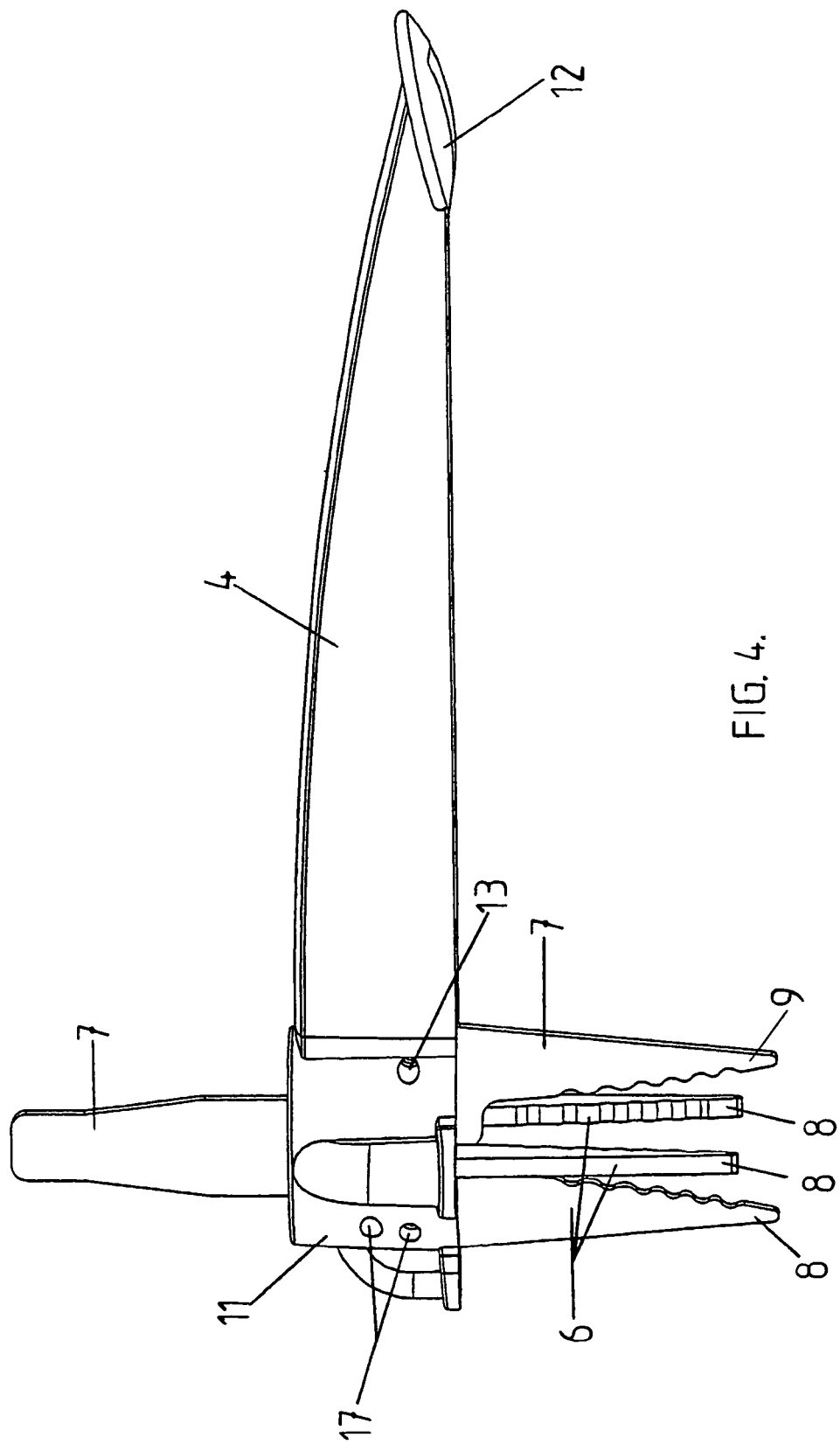
FIG. 4 is a three-dimensional view showing a solution according to an embodiment of the invention.

FIG. 4 shows a more detailed three-dimensional view of a solution according to an embodiment of the present invention, in which the first end 1 of the shaft 2 is provided with a mechanism comprising the ground support 4 and the four blades 6, 7 mounted to the first end 11 thereof. This embodiment comprises one blade 7 that is fixedly mounted to the shaft 2, to which the ground support is pivoted. The ground support is pivoted substantially transversely in relation to the longitudinal axis of the shaft 2 using a joint pin 13. The other three blades 6 are in turn pivoted only to the ground support 4 using joint pins 17. In this embodiment the ground support 4 is substantially perpendicularly positioned in respect of the shaft 2, when the shaft is placed in a vertical position as regards the ground 30, and ready to press the blades 6, 7 into the ground. Then the grip ends 8, 9 of the blades 6, 7 are placed apart from one another in accordance with FIG. 4, thus allowing the blades to be pressed into the ground so that the plant 5 to be pulled remains in the middle of the blades. Such a position of the blades 6, 7 is achieved since the force of gravity pulls the ground support 4 pivoted to the blade 7 downwards, in which case the ground support 4 is shaped such that it prevents the angle between the ground support 4 and the shaft 2 to increase above approximately 90 degrees.

In this position the blades 6, 7 are pressed into the ground 30 placed around the plant 5 or a similar target to be removed so that the ground support 4 is substantially pressed in the same direction as the ground 30 on the surface of the ground 30 while the shaft 2 still remains in the vertical position thereof. After this, when the shaft 2 starts to be turned towards the ground 30 in the direction of the ground support 4, the grip end 9 of the blade 7 fixedly mounted as the extension on the shaft 2 also starts to turn towards the middle of the area determined by all the four blades 6, 7. The moving blades 6 pivoted to the ground support 4 are functionally connected to the fixed blade 7 and therefore the grip ends 8 thereof also starts to move towards the middle. Thus, the blades 6, 7 squeeze the plant 5 in a grip-like fashion between them.

FIG. 5 shows how the blades 6, 7 are pivoted and functionally connected to one another, as FIG. 5 shows a cross sectional view of the mechanism illustrated in FIG. 4. In accordance with FIG. 5, the fixed blade 7 comprises a tooth gap 18 and the other moving blades 6 comprise at least one tooth 20, 22. The teeth of the moving blades 6 are placed in the tooth gap 18 of the fixed blade 7 such that when the shaft 2 is turned the turning fixed blade 7 also turns the moving blades 6 by means of the toothing, whereby all the four blades move simultaneously towards one another squeezing the plant 5 between them. When the shaft 2 is turned, the fixed blade 7 turns around a joint 13 in relation to the ground support 4 simultaneously turning the other moving blades 6 pivoted to the ground support 4 by means of joints 17.

In accordance with FIG. 5, the toothing is implemented in this embodiment such that the tooth 20 of the blade opposite to the fixed blade 7 is placed lowest in relation to the drive position of the device in the tooth gap 18 of the fixed blade 7. Then, the two blades are accurately placed to face one another and the grip ends 8, 9 thereof are squeezed against each other when turning the shaft 2. In addition, the blades facing one another are dimensioned such that the grip ends thereof are at the same level and are squeezed against each other when used.

According to FIG. 5, the teeth 22 of the two other moving blades are placed in parallel above the tooth 20 of the blade that is opposite to the fixed blade 7 in this embodiment. Then the two blades placed in parallel against each other may be identical in respect of one another and therefore also the grip ends thereof are placed at the same height. In this embodiment, the grip ends of the two opposed moving blades are not placed at the same height with the grip ends of the two other blades, but this would also be possible.

FIG. 6 illustrates the position of the blades 6, 7 in this embodiment in respect of each other. FIG. 6 shows that the fixed blade 7 and the blade opposite thereto are placed in a completely opposite position in relation to one another such that the grip ends thereof are squeezed against each other when the device is being used. Then again, the two other moving blades placed in parallel opposite to each other, whose teeth 22 are placed in parallel with the tooth gap 18 of the fixed blade 7, are not squeezed against each other. When using the device, the grip ends of these opposed parallel blades are squeezed against the side surfaces of the two other blades, as illustrated in FIG. 6.

Such an embodiment according to the present invention described above can be implemented also in several other ways by changing for instance the number of blades from two upwards. In addition, the toothing can be altered for instance so that all blades are provided with an arched toothing surface with several teeth connected circularly to one another. Corresponding toothing solutions are used for instance in the foldable propellers of sailing boats.

Figure 7:
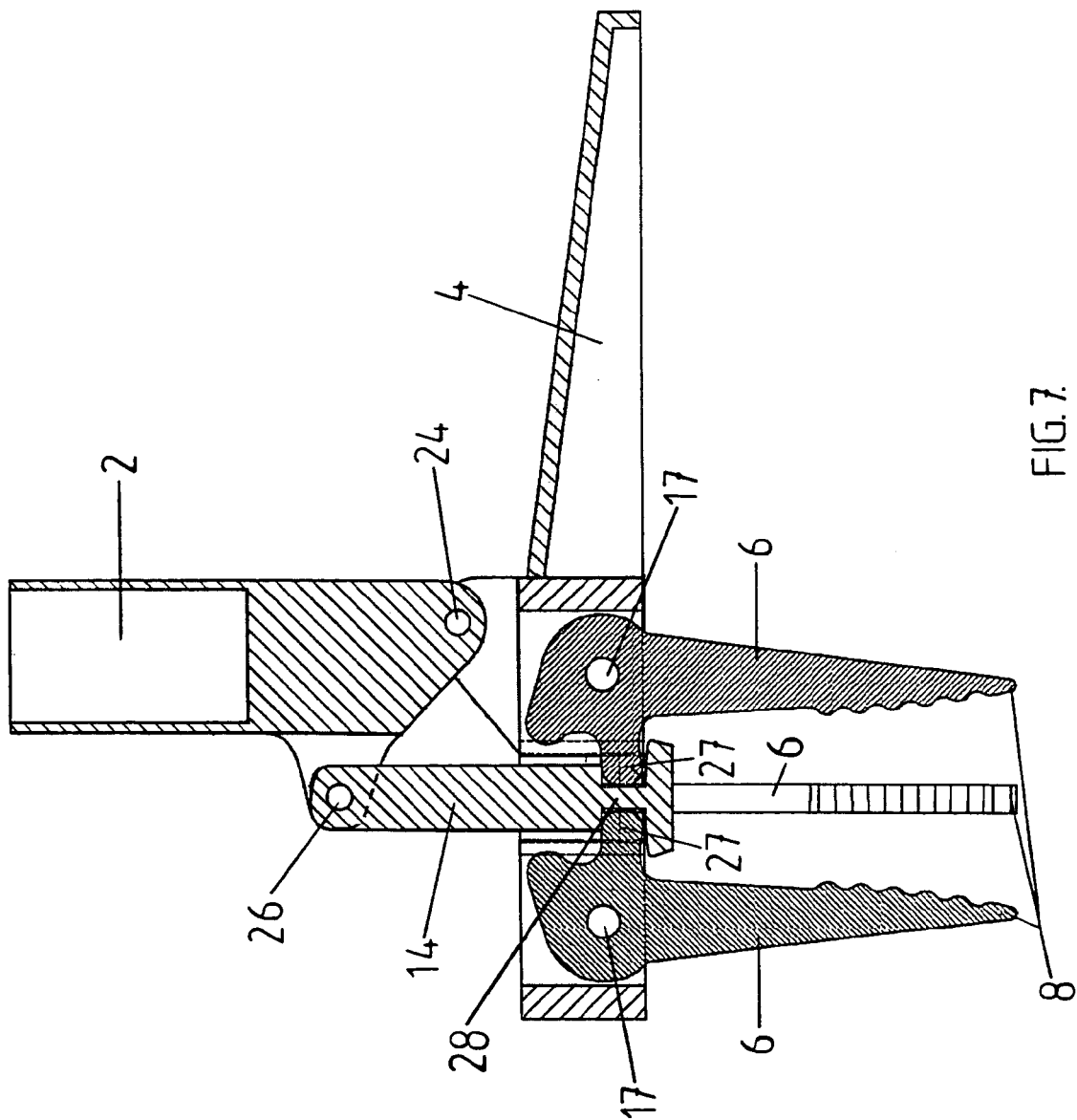
FIG. 7 shows another embodiment of the present invention.

Another embodiment of the present invention is shown in FIG. 7. In this embodiment the shaft 2 is pivoted using a joint pin 24 from the first end 1 thereof straight to the ground support 4. The shaft 2 is also provided with a lifting part 14 pivoted by means of a joint pin 26 as shown in FIG. 7. The lifting part 14 is mounted at the side of the shaft 2 in order to provide a torque shaft and directed straight downwards from the joint 26. The lifting part 14 comprises a tooth gap 28, into which the teeth 27 of the blades 6 pivoted by joint pins 17 to the ground support 4 can be arranged as shown in FIG. 7.

When the device according to the embodiment shown in FIG. 7 is used, the blades 6 provided as the extension of the shaft 2 are pressed into the ground 30 around a plant to be pulled, preferably all the way to the ground support 4. After this, the shaft 2 starts to be turned towards the ground 30 in the direction of the ground support 4, in the same way as above in the first embodiment. Thus, turning the shaft 2 around the joint 24 in respect of the ground support 4 causes the shaft 2 to turn also in respect of the blades 6 and the lifting part so that the lifting part 14 is lifted upwards. Lifting the lifting part 14 upwards causes the blades 6 functionally connected thereto by means of the teeth 27 to turn so that the grip ends 8 thereof move towards each other squeezing the plant 5 between them. Continuing to turn the shaft 2 results in the plant 5 being pulled up from the ground 30 in the same way as in the previous embodiment.

This embodiment can also be modified within the scope of the invention. For instance, the lifting mechanism can be implemented in various alternative ways.

It is apparent for those skilled in the art that as technology advances the basic idea of the invention can be implemented in various ways. The invention and the embodiments thereof are therefore not restricted to the above examples but may vary within the scope of the claims.

The invention claimed is:

1. A device for removing plants from the ground, the device comprising:
   an elongated shaft having a first end and a second end;
   the elongated shaft including a fixed blade extending from the first end, the fixed blade having a gap formed therein;
   a ground support pivotally connected to the elongated shaft;
   at least two pivot blades pivotally connected to the ground support;
   the pivot blades each having a tooth cooperating with the gap in the fixed blade to form a gear connection operable to move a grip end of the blades toward one another when the second end of the elongated shaft is moved relative to the ground support.

2. A device as claimed in claim 1, wherein the around support is pivotally coupled to the fixed blade and the elongated shaft is pivotally movable relative to the around support up to a predetermined point.

3. A device as claimed in claim 2, wherein movement of the elongated shaft toward the around support up to the predetermined point causes the blades to squeeze the plant between the blades.

4. A device as claimed in claim 3, wherein movement of the elongated shaft toward the ground support and beyond the predetermined point is operable to pry the blades and the plant from the ground.

5. A device as claimed in claim 1, comprising three pivot blades pivotally connected to the ground support, the pivot blades functionally connected to the fixed blade through the gear connection, the pivot blades moving in relation to the fixed blade and arranged in an array, and the tooth of the pivot blade opposite to the fixed blade aligned to fit into the gap of the fixed blade at a height different from the height of the teeth of the other two blades.

6. A device as claimed in claim 1, wherein movement of the elongated shaft toward the ground support is operable to move the grip end of the fixed blade toward the pivot blades, and movement of the fixed blade is operable to move the grip ends of the pivot blades toward the fixed blade by the interaction at the gear connection.

* * * * *